UNITED STATES PATENT OFFICE.

ARNOLD H. C. HEITMANN AND ERIK C. CLEMMENSEN, OF DETROIT, MICHIGAN, ASSIGNORS TO PARKE, DAVIS & COMPANY, OF DETROIT, MICHIGAN, A CORPORATION OF MICHIGAN.

ALKYL-OXYACETYL-CYANAMID AND PROCESS OF MAKING SAME.

No. 814,693.     Specification of Letters Patent.     Patented March 13, 1906.

Application filed November 25, 1905. Serial No. 289,104.

*To all whom it may concern:*

Be it known that we, ARNOLD H. C. HEITMANN, a citizen of the United States of America, and ERIK C. CLEMMENSEN, a subject of the King of Denmark, residing at Detroit, in the county of Wayne and State of Michigan, have invented certain new and useful Improvements in Alkyl-Oxyacetyl-Cyanamids and Processes of Forming Same, of which the following is a specification, reference being had therein to the accompanying drawings.

The invention relates to a new series of chemical bodies; and it consists, first, in the new substance, and, second, in the process of forming the same. The various compounds belonging to this new series may be designated as "alkyl-oxyacetyl-cyanamids" and may be formed by the condensation of an alkyl-oxyacetic acid and a cyan amid. This may be accomplished either directly by the use of a suitable condensing agent or indirectly by treatment of substances which at some point in the reaction form the said bodies which are subsequently condensed. For commercial manufacture we preferably employ the latter method, as less costly materials may be used. For example, in place of cyanamids we have discovered that other bodies, such as a thio-urea or a guanidin, may be mixed with an alkyl-oxyacetic acid and treated with a condensing agent, resulting not in a condensation product of the said bodies, but an alkyl-oxyacetyl-cyanamid.

*Preferred method of forming product.*—A mixture, preferably in molecular proportion, is formed of an alkyl-oxyacetic acid (such as diethy-oxyacetic ester) and a urea in which the oxygen has been replaced, (such as a thio-urea,) together with a condensing agent, (such as an alkali alcoholate and preferably in alcoholic solution.) The said mixture is then preferably warmed for several hours, during which time the following reaction takes place:

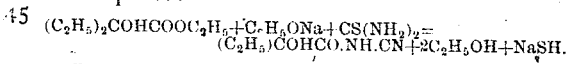

The reaction product is carefully neutralized with an acid, preferably diluted acetic acid:

$$NaSH + CH_3COOH = CH_3COONa + H_2S.$$

The alcohol is then distilled off and the product crystallized out from the remaining aqueous solution.

As a modification of the process above described a guanidin may be substituted for the thio-urea, (preferably a guanidin salt, such as guanidin-sulfo-cyanid,) the other substances remaining the same and the reaction being as follows:

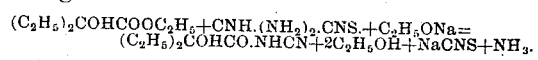

The reaction product is then carefully neutralized and separated in the manner above described.

Where it is desired to employ the direct process, an alkyl-oxyacetic ester is mixed, preferably in molecular proportion, with a cyanamid and a condensing agent, such as an alkali alcoholate, and upon warming the mixture the following reaction takes place:

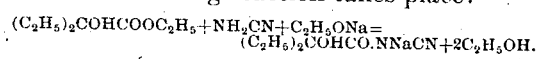

The reaction product is then separated, as above described:

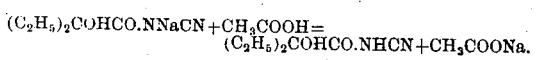

The bodies belonging to the new series are characterized by the following properties: They are crystalline, colorless, have a high melting-point, are soluble in water and alcohol, but insoluble in ether, and only slightly soluble in other organic solvents. Upon treating with a hydrolyzing agent, as dilute sulfuric acid, they are transposed into ureids of alkyl-oxyacetic acids by the following reaction:

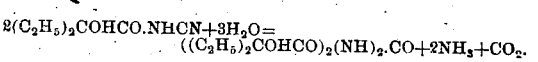

Thus an important use of the new product is in the manufacture of the said ureids.

The specific body (diethyl-oxyacetyl-cyanamid) is further characterized by melting at a temperature of 235° centigrade.

Where in the claims the term "alkyl-oxyacetic acid" is employed, this is meant also to include the ester.

What we claim as our invention is—

1. A new body being a condensation product of an alkyl-oxyacetic acid and a cyanamid, which is characterized by being crystalline, colorless, having a high melting-point, being soluble in water and alcohol but insoluble in ether and only slightly soluble in other organic solvents; upon treating with a hydrolyzing agent, such as dilute sulfuric acid, is transposed into a ureid of alkyl-oxyacetic acid.

2. A new body which is a condensation product of diethyl-oxyacetic acid and cyanamid, which is characterized by being crystalline, colorless, soluble in water and alcohol but insoluble in ether and only slightly soluble in other organic solvents and melting at a temperature of 235° centigrade; upon hydrolyzing, it is transposed into a ureid of diethyl-oxyacetic acid.

3. The process of forming alkyl-oxyacetyl-cyanamids which consists in condensing an alkyl-oxyacetic acid and a cyanamid.

4. The process of forming alkyl-oxyacetyl-cyanamids which consists in treating with a condensing agent an alkyl-oxyacetic acid and a urea in which the oxygen has been substituted.

5. The process of forming diethyl-oxyacetyl-cyanamid which consists in treating with a condensing agent the diethyl-oxyacetic ester and a cyanamid.

6. The process of forming diethyl-oxyacetyl-cyanamids which consists in treating with a condensing agent diethyl-oxyacetic ester and a urea in which the oxygen has been substituted.

7. The process of forming alkyl-oxyacetyl-ureas which consists in forming a condensation product of an alkyl-oxyacetic acid and a cyanamid and in hydrolyzing said product to form the alkyl-oxyacetyl-urea.

8. The process of forming alkyl-oxyacetyl-ureas which consists in forming a condensation product of an alkyl-oxyacetic acid and a cyanamid by the treatment with a condensing agent of a mixture of the said acid and a urea, in which the oxygen atom is replaced, and in then hydrolyzing the product to obtain the alkyl-oxyacetyl-urea.

In testimony whereof we affix our signatures in presence of two witnesses.

ARNOLD H. C. HEITMANN.
ERIK C. CLEMMENSEN

Witnesses:
AURELIAS WILLEANIS,
JAMES P. BARRY.